US009462437B2

(12) United States Patent
Uusitalo et al.

(10) Patent No.: US 9,462,437 B2
(45) Date of Patent: Oct. 4, 2016

(54) METHOD AND APPARATUS FOR ADJUSTING DEVICE FUNCTIONALITIES BASED ON LOCATION, MOVEMENT, AND/OR NOISE

(71) Applicant: Nokia Corporation, Espoo (FI)

(72) Inventors: Mikko Aleksi Uusitalo, Helsinki (FI); Jari-Jukka Harald Kaaja, Järvenpää (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 11 days.

(21) Appl. No.: 13/853,621

(22) Filed: Mar. 29, 2013

(65) Prior Publication Data

US 2014/0295811 A1   Oct. 2, 2014

(51) Int. Cl.
| | | |
|---|---|---|
| *H04W 4/16* | (2009.01) | |
| *H04W 4/02* | (2009.01) | |
| *H04W 4/12* | (2009.01) | |
| *H04W 48/04* | (2009.01) | |
| *H04M 3/56* | (2006.01) | |
| *H04M 1/725* | (2006.01) | |
| *H04L 12/18* | (2006.01) | |
| *H04L 12/58* | (2006.01) | |
| *H04L 29/08* | (2006.01) | |

(52) U.S. Cl.
CPC ............. *H04W 4/16* (2013.01); *H04L 12/189* (2013.01); *H04L 12/1827* (2013.01); *H04L 51/20* (2013.01); *H04L 67/14* (2013.01); *H04M 3/568* (2013.01); *H04W 4/026* (2013.01); *H04W 4/027* (2013.01); *H04M 1/72569* (2013.01); *H04M 1/72577* (2013.01); *H04W 4/12* (2013.01); *H04W 48/04* (2013.01)

(58) Field of Classification Search
None
See application file for complete search history.

(56) References Cited

U.S. PATENT DOCUMENTS

| 7,171,221 B1 | 1/2007 | Amin et al. |
| 2008/0232277 A1 | 9/2008 | Foo et al. |

(Continued)

FOREIGN PATENT DOCUMENTS

WO    WO 2014027190 A1 *   2/2014

OTHER PUBLICATIONS

A Guide to Freeconference.com Call Management for Debtors Anonymous Phone Meetings, web page retrieved from http://www.datig.net/documents/AR_Call_Management.pdf, 2 pages, Debtors Anonymous Telephone Intergroup © DATIG 2011.

*Primary Examiner* — Charles Appiah
*Assistant Examiner* — Margaret G Mastrodonato
(74) *Attorney, Agent, or Firm* — Ditthavong & Steiner, P.C.

(57) ABSTRACT

An approach is provided adjusting one or more device functionalities based on location, movement, noise, or a combination thereof. An adjustment platform determines at least one state of movement, at least one ongoing communication session, or a combination thereof associated with at least one device, wherein the at least one state of movement includes, at least in part, location information, orientation information, speed information, acceleration information, time information, or a combination thereof. The adjustment platform then causes, at least in part, an initiation of one or more adjustments to one or more functionalities of the at least one device based, at least in part, on the at least one state of movement, the at least one ongoing communication session, or a combination thereof.

19 Claims, 9 Drawing Sheets

(56) References Cited

U.S. PATENT DOCUMENTS

| | | | |
|---|---|---|---|
| 2008/0305780 A1* | 12/2008 | Williams et al. | 455/414.1 |
| 2009/0011753 A1 | 1/2009 | Barnier | |
| 2009/0298482 A1* | 12/2009 | Yen et al. | 455/414.2 |
| 2010/0067680 A1 | 3/2010 | Hanson et al. | |
| 2011/0043377 A1* | 2/2011 | McGrath et al. | 340/905 |
| 2011/0200183 A1 | 8/2011 | Erhart et al. | |
| 2013/0279677 A1* | 10/2013 | Beerse | H04M 3/2227 379/202.01 |
| 2013/0331127 A1* | 12/2013 | Sabatelli et al. | 455/456.3 |

\* cited by examiner

METHOD AND APPARATUS FOR ADJUSTING DEVICE FUNCTIONALITIES BASED ON LOCATION, MOVEMENT, AND/OR NOISE

BACKGROUND

Service providers and device manufacturers (e.g., wireless, cellular, etc.) are continually challenged to deliver value and convenience to consumers by, for example, providing compelling network services. One area of interest has been the development of services that enable users to conduct multiparty teleconferences using mobile devices (e.g., a mobile phone or a tablet). In particular, multiparty teleconferencing is becoming more popular because it is often environmentally friendlier and more cost effective than having multiple users meet face-to-face. However, the sensitivity and effectiveness of microphones associated with mobile devices have also increased to the point where movement of such devices and/or various background noises can easily disrupt and/or degrade the quality of the teleconference. One way to prevent such disturbances and/or degradations is to have users manually mute their respective mobile devices while they are not speaking. However, users often forget to mute their respective devices and doing so can require cumbersome interaction with the device. Accordingly, service providers and device manufactures face significant technical challenges to create services that enable intuitive device muting and/or communications based on location, movement, noise, or a combination thereof.

SOME EXAMPLE EMBODIMENTS

Therefore, there is a need for an approach for adjusting one or more device functionalities based on location, movement, noise, or a combination thereof.

According to one embodiment, a method comprises determining at least one state of movement, at least one ongoing communication session, or a combination thereof associated with at least one device, wherein the at least one state of movement includes, at least in part, location information, orientation information, speed information, acceleration information, or a combination thereof. The method also comprises causing, at least in part, an initiation of one or more adjustments to one or more functionalities of the at least one device based, at least in part, on the at least one state of movement, the at least one ongoing communication session, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to determine at least one state of movement, at least one ongoing communication session, or a combination thereof associated with at least one device, wherein the at least one state of movement includes, at least in part, location information, orientation information, speed information, acceleration information, or a combination thereof. The apparatus also causes, at least in part, an initiation of one or more adjustments to one or more functionalities of the at least one device based, at least in part, on the at least one state of movement, the at least one ongoing communication session, or a combination thereof.

According to another embodiment, a computer-readable storage medium carries one or more sequences of one or more instructions which, when executed by one or more processors, cause, at least in part, an apparatus to determine at least one state of movement, at least one ongoing communication session, or a combination thereof associated with at least one device, wherein the at least one state of movement includes, at least in part, location information, orientation information, speed information, acceleration information, or a combination thereof. The apparatus also causes, at least in part, an initiation of one or more adjustments to one or more functionalities of the at least one device based, at least in part, on the at least one state of movement, the at least one ongoing communication session, or a combination thereof.

According to another embodiment, an apparatus comprises means for determining at least one state of movement, at least one ongoing communication session, or a combination thereof associated with at least one device, wherein the at least one state of movement includes, at least in part, location information, orientation information, speed information, acceleration information, or a combination thereof. The apparatus also comprises means for causing, at least in part, an initiation of one or more adjustments to one or more functionalities of the at least one device based, at least in part, on the at least one state of movement, the at least one ongoing communication session, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for adjusting one or more device functionalities based on location, movement, noise, or a combination thereof are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
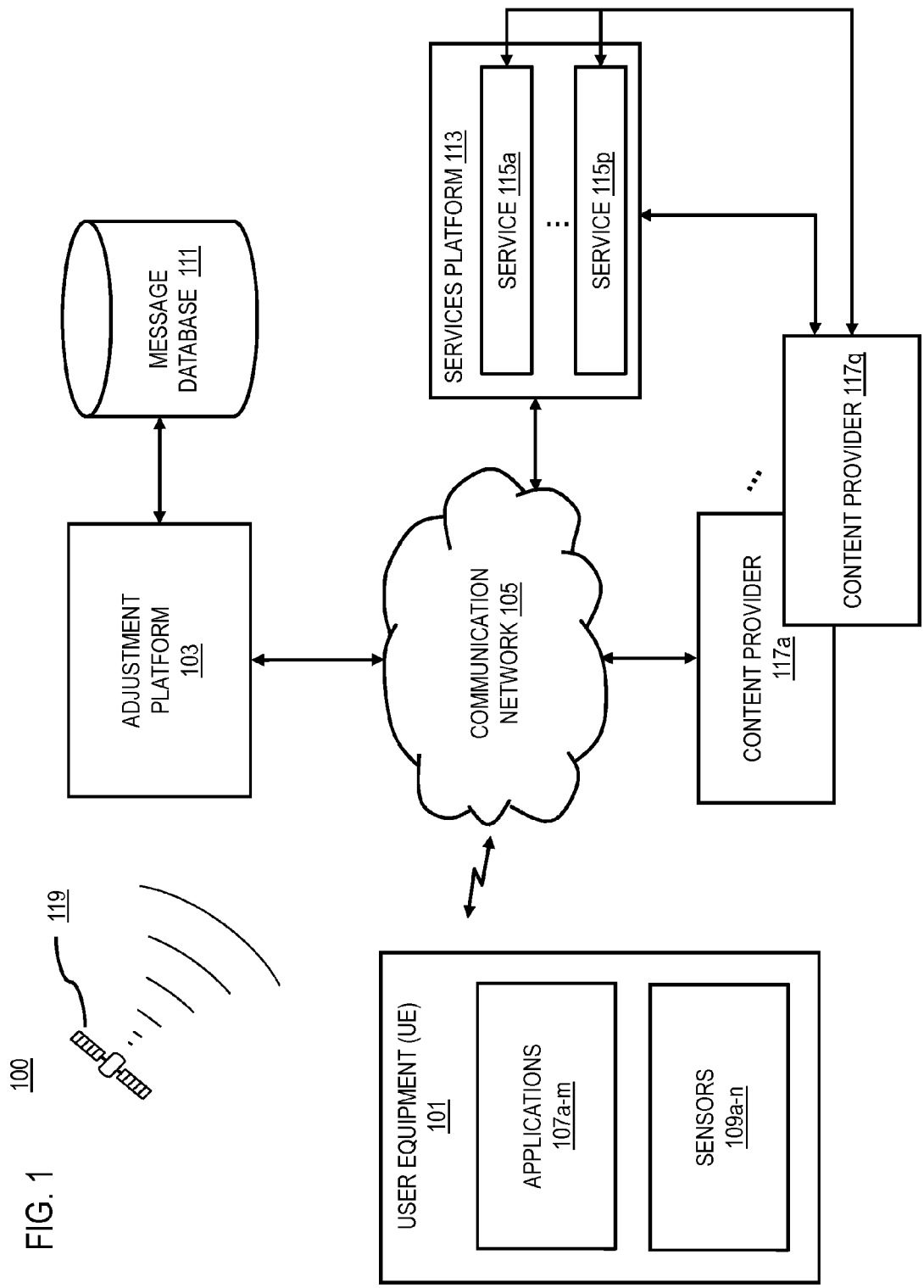
FIG. 1 is a diagram of a system capable of adjusting one or more device functionalities based on location, movement, noise, or a combination thereof, according to one embodiment.

FIG. 1 is a diagram of a system capable of adjusting one or more device functionalities based on location, movement, noise, or a combination thereof, according to one embodiment. As previously discussed, one area of interest has been the development of services that enable user to conduct multiparty teleconferences using mobile devices. More specifically, multiparty teleconferencing is becoming more popular because it is often environmentally friendlier and more cost effective than having multiple users meet fact-to-face. However, the sensitivity and effectiveness of microphones associated with mobile devices have also increased to the point where movement of such devices and/or various background noises can easily disrupt and/or degrade the quality of the teleconference. One way to prevent such disturbances and/or degradations is to have users manually mute their respective mobile devices while they are not speaking. However, users often forget to mute their respective devices and doing so can require cumbersome interaction with the device.

To address this problem, a system 100 of FIG. 1 introduces the capability to adjust one or more device functionalities based on location, movement, noise, or a combination thereof. As shown in FIG. 1, the system 100 comprises a user equipment (UE) 101 (e.g., a mobile phone or a tablet) having connectivity to an adjustment platform 103 via a communication network 105. The UE 101 includes or has access to one or more applications 107*a*-107*m* (also collectively referred to as applications 107). By way of example, the applications 107 may include mapping and/or navigation applications, location-based applications (e.g., enabling "check-ins"), voice-recognition applications, messaging applications (e.g., short message service (SMS), multimedia service (MMS), etc.), an Internet browser, media applications, social networking applications, etc. In addition, the UE 101 also includes one or more sensors 109*a*-109*n* (also collectively referred to as sensors 109). In particular, the sensors 109 may include, for example, a microphone, a global positioning system (GPS) receiver, a compass, a magnetometer, a tilt or angle sensor, an accelerometer, or a combination thereof.

In one embodiment, the adjustment platform 103 may include or be associated with at least one message database 111, which may exist in whole or in part within the adjustment platform 103. In one example embodiment, the adjustment platform 103 may exist in whole or in part within the UE 101, or independently. The at least one message database 111 may include one or more generated calls (e.g., "user 'A' is moving with attention on that at the moment," "user 'A' should be able to rejoin the teleconference in 5 minutes," etc.), one or more SMS or MMS generated messages (e.g., "I'll be home in 15 minutes," "I'll be at the daycare in 10 minutes, please have my child ready," "I'll be home in 30 minutes, please start the sauna," etc.), one or more automatic warnings (e.g., an audible alert for an upcoming busy interaction), etc. In addition, the at least one message database 111 may also include a list of one or more predetermined adjustments corresponding to one or more contexts.

The UE 101 is also connected to a services platform 113 via the communication network 105. The services platform 113 includes one or more services 115*a*-115*p* (also collectively referred to as services 115). The services 115 may include a wide variety of services such as content provisioning services for one or more of the applications 107. By way of example, the services 115 may include mapping and/or navigation services, phone and electronic communication services (e.g., teleconferencing, email, SMS, etc.), location-based services (e.g., traffic updates), media related services, social networking services, etc. The UE 101, the services platform 113, and the services 115 also have connectivity to one or more content providers 117*a*-117*q* (also collectively referred to as content providers 117). The content providers 117 also may provision a wide variety of content (e.g., generated messages, generated calls, maps, guidance commands, etc.) to the components of the system 100.

In certain embodiments, the applications 107 may utilize location-based technologies (e.g., GPS, cellular triangulation, Assisted GPS (A-GPS), etc.) to make a request to one or more services 115 for location-based data (e.g., mapping and/or navigation information, muting zones, social networking information, etc.) based on a position relative to the UE 101. For example, the UE 101 may include a GPS receiver to obtain geographic coordinates from the satellites 119 to determine its current location.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the system 100 determines at least one state of movement, at least one ongoing communication session, or a combination thereof associated with at least one device (e.g., a mobile phone or a tablet), wherein the at least one state of movement includes, at least in part, location information, orientation information, speed information, acceleration information, time information, or a combination thereof. In particular, the at least one ongoing communication session is based, at least in part, on one or more telecommunication, data, voice, or a combination thereof connections. By way of example, a user may be participating in a multiparty teleconference with his or her mobile device (e.g., the UE 101) and at the same time, moving, changing places (e.g., walking from one room to another), etc. while still on the teleconference.

In one or more embodiments, the system 100 processes and/or facilitates a processing of sensor information to determine the at least one state of movement, the at least one ongoing communication session, at least one level of speaking, at least one name of a user associated with the at least one device, or a combination thereof. For example, the system 100 can determine the state of movement based, at least in part, on the position, orientation, movement or acceleration changes of the UE 101 being greater than a threshold (th1) over a time (t1) (e.g., a user slightly moving his or her device on a desk compared to a user walking with his or her device). In one embodiment, the system 100 can determine at least one level of speaking based, at least in part, on whether the user has not said anything for a time period (t2) (i.e., the system 100 has not recognized any speech input of a volume higher than a threshold (th2)). In certain embodiments, the system 100 can also determine at least one level of speaking based, at least in part, on whether at least x number of people (e.g., two or more) are speaking on the teleconference at a volume higher than the threshold th2 within the time period t2 or less. In addition, the at least one level of speaking may also include background noise such as a number of people speaking in a public place. In one example use case, the system 100 can determine that someone on one end of a teleconference is repeatedly saying the user's name without a response from the user based, at least in part, on one or more speech recognition technologies.

In one embodiment, the system 100 causes, at least in part, an initiation of one or more adjustments to one or more functionalities of the at least one device (e.g., calling) based, at least in part, on the at least one state of movement, the at least one ongoing communication session, or a combination thereof. More specifically, the one or more adjustments are based, at least in part, on muting the at least one device, at least one generated call, at least one generated notification, at least one generated message, or a combination thereof. By way of example, if the system 100 determines that a user is on a multiparty teleconference and the user has not said anything for the time period t2 (i.e., the system 100 has not recognized any speech input of a volume higher than the threshold th2) and the user is moving (i.e., the system 100 determines that the movement of the at least one device is greater than the threshold th1 over a time period greater than t1), then the system 100 can mute the at least one device. In one or more embodiments, it is contemplated that once the system 100 determines that the user has resumed speaking and/or has stopped moving, the system 100 can restore the one or more functionalities of the at least one device back to their previous state (e.g., unmuting the UE 101).

In one or more embodiments, the system 100 processes and/or facilitates a processing of the location information to determine at least one value of background noise, at least one muting zone, or a combination thereof. By way of example, the system 100 may determine that there is no one else speaking or making noise near the user while he or she is on a teleconference or the system 100 may determine that there are a number of other users talking and/or that there is an above average amount of background noise near the at least one device (e.g., from a television, a radio, a street fair, etc.). In one embodiment, it is contemplated that a muting zone is an area or zone where there is a high density of people (e.g., a downtown area, a shopping area, a sports complex, a movie theater, etc.) and therefore a greater likelihood that any background noise will be greater than the threshold th2 and as such disrupt and/or disturb the ongoing teleconference.

In one embodiment, once the system 100 determines the at least one value of background noise, the at least one muting zone, or a combination thereof, the system 100 causes, at least in part, at least one modification of the one or more adjustments (e.g., device muting) based, at least in part, on the at least one value of background noise, the at least one muting zone, or a combination thereof. By way of example, if the system 100 determines that a user is in a noisy location, then the system 100 can modify the time period t2 before the system 100 will mute the at least one device (i.e., the system 100 mutes the at least one device more quickly). In one or more embodiments, the system 100 can compare the location of the at least one device (e.g., the place, the position, the time, etc.) against one or more existing muting zones (e.g., a sports venue) and then adjust the one or more functionalities of the at least one device accordingly. Further, in one embodiment, if the system 100 determines that a user is located in a muting zone (e.g., at a shopping center), then the system 100 can cause, at least in part, a muting of the at least one device (e.g., the UE 101) by default rather than based, at least in part, on the user not speaking and/or moving.

In one or more embodiments, the system 100 can cause, at least in part, at least one modification of at least one mapping application, at least one navigation application, at least one location-based application, or a combination thereof associated with the at least one device (e.g., a mapping and/or navigation application 107) based, at least in part, on the at least one level of background noise, the at least one muting zone, or a combination thereof. More specifically, the system 100 can cause, at least in part, the one or more muting zones to be drawn on and/or added to a mapping and/or navigation application 107, for example, so that a user can know where device muting is on by default and off elsewhere and therefore be able to quickly determine an area or zone that is more conducive to being on the teleconference.

In one embodiment, the system 100 can determine one or more contexts associated with the user of the at least one device based, at least in part, on the at least one state of movement. More specifically, the system 100 can determine the one or more contexts based, at least in part, on the sensor information and any additional information on the at least one device or reachable by the at least one device (e.g., the day, the time, the location of the user's home, the location of the user's daycare, etc.). For example, the system 100 can generally determine that the user is moving while on a multiparty teleconference or that the user is approaching a known destination (e.g., a home, a daycare, a restaurant, an office, etc.).

In one or more embodiments, the system 100 then determines the one or more adjustments (e.g., device muting, call generation, message generation, etc.) based, at least in part, on the one or more contexts. In one example use case, if the system 100 determines that the user is on a teleconference and at least one other user also on the teleconference is repeatedly saying the user's name while the user is not speaking, but is moving (e.g., walking into another room), then the system 100 can initiate at least one generated call to be communicated by the system 100 to at least one other device associated with the at least one other user. For example, the at least one generated call may state, "user 'A' is moving now with his or her attention on that at the moment." In one embodiment, it is contemplated that if the system 100 can determine an area away from the user where it would be more likely that the user can respond, the system 100 could cause, at least in part, at least one other generated call to be communicated to the at least one other device (e.g., stating the estimated time that it will take the user to arrive into a better location to continue talking) As a result, the at least one other user would not need to spend extra time and energy to get ahold of the user while the user is unavailable to talk. In another example use case, if the system 100 determines that the at least one user is approaching his or her house after work, the system 100 can cause, at least in part, a communication of at least one generated message (e.g., an SMS) to be sent to at least one other device (e.g., the device of the user's spouse) stating that the user will be home in approximately 15 minutes, for example, so that the user's spouse can start getting food ready or otherwise prepare for the user's arrival, for example. Similarly, if the system 100 determines that the user is approximately 10 minutes away from his or her child's daycare, for example, the system 100 can cause, at least in part, a communication of at least one generated message (e.g., an SMS) to be sent to the daycare to inform the daycare to prepare the child for the user's arrival. Further, if the system 100 determines that the at least one user is within 30 minutes of arriving home on a Friday evening, for example, the system 100 can cause, at least in part, a communication of at least one generated message (e.g., an SMS) to be sent to the at least one other device stating that someone should start heating up the sauna, for example.

In one embodiment, the system 100 causes, at least in part, a presentation of at least one notification on the at least one device based, at least in part, on the one or more adjustments. For example, the at least one notification may include one or more sounds, one or more lights, one or more vibrations, or a combination thereof associated with the at least one device. As a result of the presentation, the user can be informed by the system 100 as to what is happening with his or her device as a result of the location, the movement, the noise, or a combination thereof.

In one or more embodiments, wherein the user is driving and talking on the at least one device, the system 100 can process and/or facilitate a processing of the location information to determine at least one degree of driving complexity. For example, the system 100 can determine that the user is driving and talking on the phone based, at least in part, on the vehicle's hands-free system and the system 100 can determine that the user is approaching an area that requires additional attention to traffic (e.g., a complicated interchange, a traffic jam, etc.) based, at least in part, on the number of upcoming turns (e.g., a complicated intersection or interchange), the amount of traffic (e.g., based on one or more traffic updates from one or more services 115), or a combination thereof. In one embodiment, the system 100 then causes, at least in part, a presentation of at least one other notification on the at least one device (e.g., an audio and/or visual alert) based, at least in part, on the degree of driving complexity to warn the user of the one or more upcoming events.

In one embodiment, the system 100 can process and/or facilitate a processing of one or more incoming calls to the at least one device to determine at least one degree of priority for each of the one or more incoming calls. By way of example, one of the one or more calls may be from the spouse of the user and another one of the one or more calls may be from a stranger. More specifically, the system 100 can determine the at least one degree of priority based, at least in part, on the time that the user spends on each call or based on user input. Consequently, in one or more embodiments, the system 100 causes, at least in part, at least one other modification of the one or more adjustments (e.g., device muting) based, at least in part, on the at least one degree of priority. For example, the criteria for muting the at least one device (e.g., the time period t2) could be different between the different calls (e.g., the at least one device could be muted more quickly for calls with a high priority).

By way of example, the UE 101, adjustment platform 103, the applications 107, the sensors 109, the message database 111, the services platform 113, the services 115, the content providers 117, and the satellites 119 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
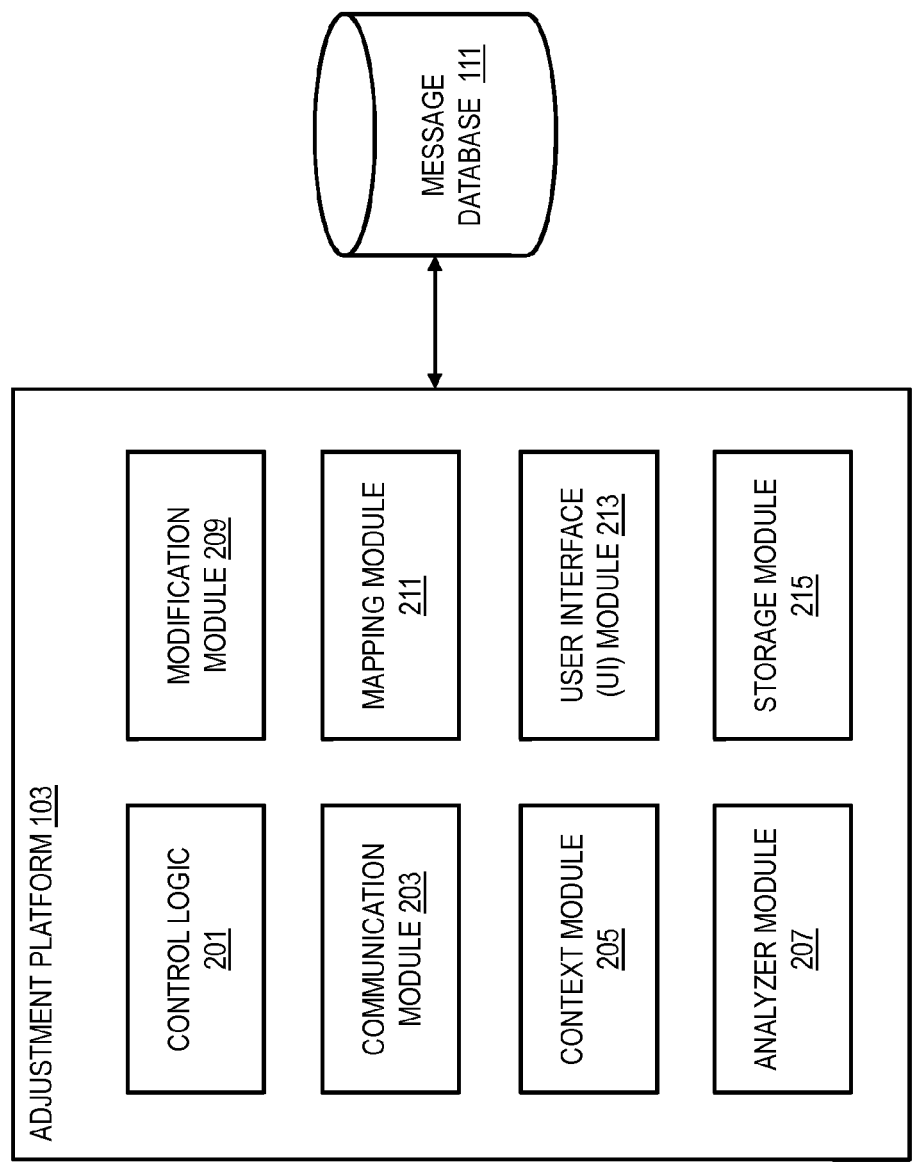
FIG. 2 is a diagram of the components of an adjustment platform, according to one embodiment.

FIG. 2 is a diagram of the components of the adjustment platform 103, according to one embodiment. By way of example, the adjustment platform 103 includes one or more components for adjusting one or more device functionalities based on location, movement, noise, or a combination thereof. It is contemplated that the functions of these components may be combined in one or more components or performed by other components of equivalent functionality. In this embodiment, the adjustment platform 103 includes a control logic 201, a communication module 203, a context module 205, an analyzer module 207, a modification module 209, a mapping module 211, a user interface (UI) module 213, and a storage module 215.

In one embodiment, the control logic 201 oversees task, including tasks performed by the communication module 203, the context module 205, the analyzer module 207, the modification module 209, the mapping module 211, the UI module 213, and the storage module 215. For example, although other modules may perform the actual task, the control logic 201 may determine when and how those tasks are performed or otherwise direct the other modules to perform the task. In one embodiment, the control logic 201 causes, at least in part, an initiation of one or more adjustments to the one or more functionalities of the at least one device (e.g., device muting, call generation, call notification, etc.) based, at least in part, on the at least one state of movement, the at least one ongoing communication session, or a combination thereof.

The communication module 203 in certain embodiments is used for communication between the UE 101, the adjustment platform 103, the applications 107, the sensors 109, the message database 111, the services platform 113, the services 115, the content providers 117, and the satellites 119. In one embodiment, the communication module 203 may also be used in connection with the analyzer module 207 to process and/or facilitate a processing of one or more incoming calls to the at least one device to determine at least one degree of priority for each of the one or more incoming calls.

In one embodiment, the context module 205 is used in connection with the communication module 203 and the analyzer module 207 to determine at least one state of movement, at least one ongoing communication session, or a combination thereof associated with at least one device, wherein the at least one state of movement includes, at least in part, location information, orientation information, speed information, acceleration information, time information, or a combination thereof. Moreover, the at least one ongoing communication session is based, at least in part, on one or more telecommunication, data, voice, or a combination thereof connections. The context module 205 may also be used determine one or more contexts associated with the user of the at least one device based, at least in part, on the at least one state of movement (e.g., driving, walking, moving towards a known destination, etc.). More specifically, the context module 205 may determine the one or more contexts based on the sensor information derived from the sensors 109 and any additional information on the at least one device or reachable by the at least one device (e.g., the day, the time, the location of the user's home, the location of the user's daycare, etc.).

In one or more embodiments, the analyzer module 207 is used to process and/or facilitate a processing of sensor information to determine the at least one state of movement, the at least one ongoing communication session, at least one level of speaking, at least one name of a user associated with the at least one device, or a combination thereof. By way of example, the analyzer module 207 can determine the state of movement based, at least in part, on the position, orientation, movement or acceleration changes of the UE 101 being greater than the threshold th1 over the time t1. Likewise, in one embodiment, the analyzer module can determine at least one level of speaking based, at least in part, on whether the user has not said anything for the time period t2. In addition, in one embodiment, the analyzer module 207 can determine whether someone on one end of a teleconference is calling a user's name with a response from the user based, at least in part, on one or more speech recognition technologies. The analyzer module 207 may also be used to process and/or facilitate a processing of location information to determine at least one value of background noise, at least one muting zone, or a combination thereof. For example, the analyzer module 207 can determine at least one level of speaking based, at least in part, on whether at least x number of people (e.g., two or more) are speaking on a teleconference at a volume higher than th2 within a time period of t2 or less. In addition, the analyzer module 207 could compare the location information against population density information and/ or point of interest (POI) information derived from one or more services 115 and/or one or more content providers 117, for example.

In one embodiment, the analyzer module 207 also may be used to determine the one or more adjustments (e.g., device muting) based, at least in part, on the one or more contexts. For example, the analyzer module 207 can reference the one or more determined contexts against a database of one or more corresponding adjustments stored in the message database 111, for example. The analyzer module 207 may also be used to process and/or facilitate a processing of the location information to determine at least one degree of driving complexity. For example, the analyzer module 207 can determine that the user is driving and talking based, at least in part, on the vehicle's hands-free system and the analyzer module 207 can determine the at least one degree of driving complexity based on the number of upcoming turns (e.g., a complicated intersection and/or interchange), the amount of traffic based on one or more traffic updates from one or more services 115, for example, or a combination thereof. The analyzer module 207 also may be used to process and/or facilitate a processing of one or more incoming calls to the at least one device (e.g., a mobile phone) to determine at least one degree of priority for each of the one or more incoming calls. By way of example, the analyzer module 207 may determine the at least one degree of priority based, at least in part, on the time spent on each call or based on user input (e.g., a call from the user's spouse will be given a higher priority than a call from a stranger).

The modification module 209 in certain embodiments is used to cause, at least in part, at least one modification of the one or more adjustments based, at least in part, on the at least one value of background noise, the at least one muting zone, or a combination thereof. By way of example, when the analyzer module 207 determines that the at the at least one device is in a noisy environment or a muting zone, the modification module 209 can cause, at least in part, the time after which a device will be muted to be reduced or device muting can be set as the default, respectively. The modification module 209 may also be used to cause, at least in part, at least one other modification of the one or more adjustments based, at least in part, on the at least one degree of priority. As previously discussed, if the analyzer module 207 determines that the at least one device is receiving multiple calls simultaneously and one of those calls is from the spouse of the user (i.e., a call with a high degree of priority), the modification module 209 can cause, at least in part, the time after which the at least one device will be muted to be reduced so as to reduce the likelihood of background noises disturbing the teleconference including, at least in part, the user and his or her spouse.

In one embodiment, the mapping module 211 is used to cause, at least in part, at least one modification of at least one mapping application, at least one navigation application, at least one location-based application, or a combination thereof associated with the at least one device based, at least in part, on the at least one level of background noise, the at least one muting zone, or a combination thereof. For example, once the analyzer module 207 determines the at least one value of background noise, the at least one muting zone, or a combination thereof, those areas could be drawn on and/or added to the mapping and/or navigation application 107, for example, by the mapping module 211 (e.g., as an optional layer).

In one or more embodiments, the UI module 213 is used to cause, at least in part, a presentation of at least one notification on the at least one device based, at least in part, on the one or more adjustments. More specifically, the at least one notification may include one or more sounds, one or more lights, one or more vibrations, or a combination thereof associated with the at least one device. The UI module 213 may also be used to cause, at least in part, a presentation of at least one other notification on the at least one device based, at least in part, on the degree of driving complexity (e.g., an audible alert for an upcoming busy interaction).

Figure 3:
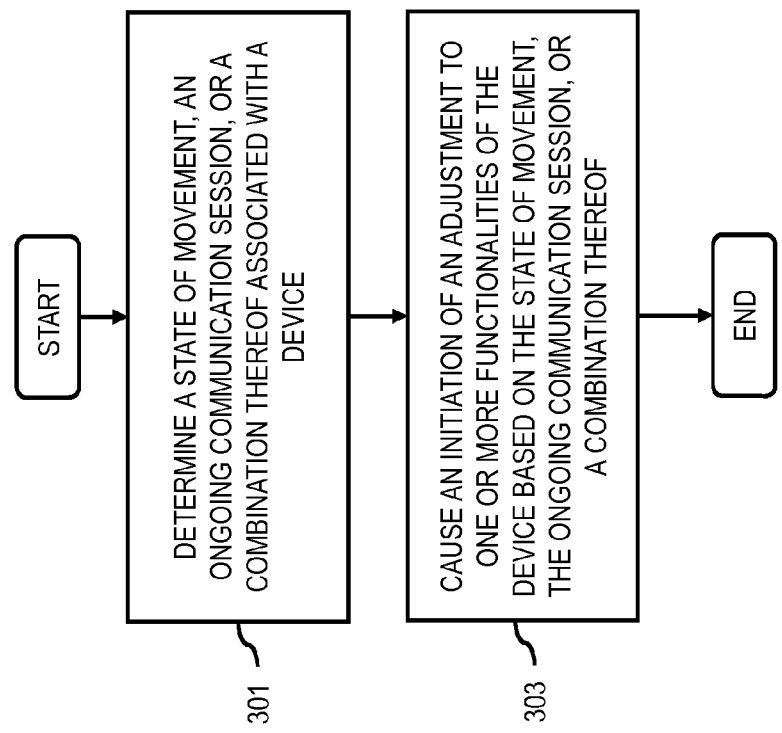
FIGS. 3-5 are flowcharts of processes for adjusting one or more device functionalities based on location, movement, noise, or a combination thereof, according to one embodiment.
Figure 4:
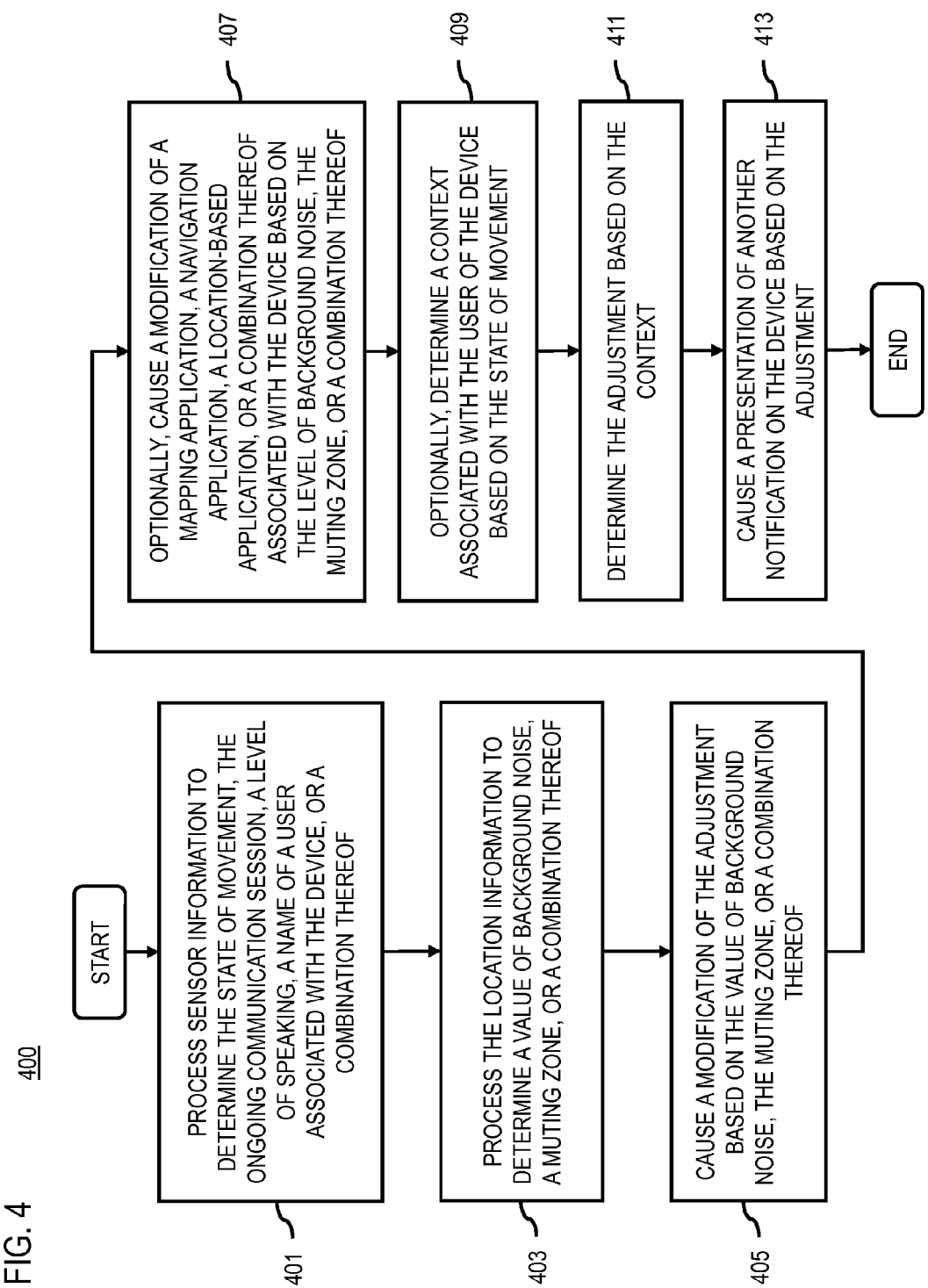
Figure 5:
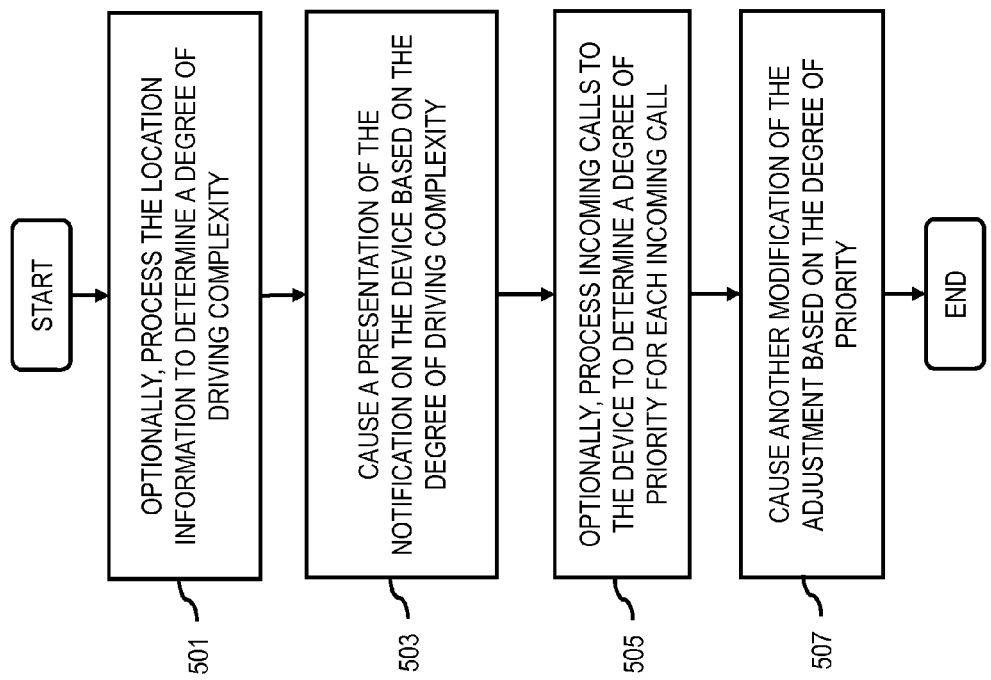
Figure 8:
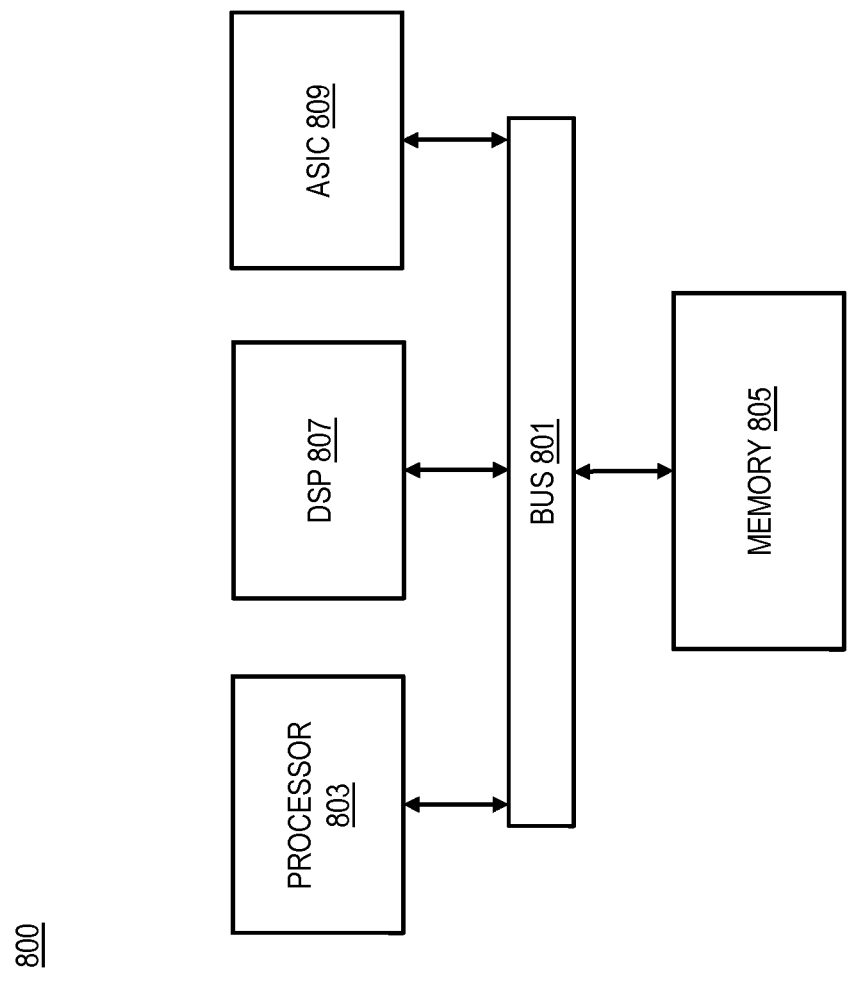
FIG. 8 is a diagram of a chip set that can be used to implement an embodiment of the invention.

FIGS. 3-5 are flowcharts of processes for adjusting one or more device functionalities based on location, movement, noise, or a combination thereof, according to one embodiment. In one embodiment, the adjustment platform 103 performs the process 300 and is implemented in, for instance, a chip set including a processor and a memory as shown in FIG. 8. In step 301, the adjustment platform 103 determines at least one state of movement, at least one ongoing communication session, or a combination thereof associated with at least one device, wherein the at least one state of movement includes, at least in part, location information, orientation information, speed information, acceleration information, time information, or a combination thereof. As previously discussed, the at least one ongoing communication session is based, at least in part, on one or more telecommunication, data, voice, or a combination thereof connections. In one example use case, a user may be participating in a multiparty teleconference with his or her mobile device (e.g., a mobile phone or a tablet) and at the same time, moving, changing places (e.g., walking from one room to another), etc. while still on the teleconference.

In step 303, the adjustment platform 103 causes, at least in part, an initiation of one or more adjustments to one or more functionalities of the at least one device based, at least in part, on the at least one state of movement, the at least one ongoing communication session, or a combination thereof. In particular, the one or more adjustments are based, at least in part, on muting the at least one device, at least one generated call, at least one generated notification, at least one generated message, or a combination thereof. Moreover, the one or more functionalities of the at least one device may include calling, messaging, emailing, browsing the Internet, etc. In one example use case, if the adjustment platform 103 determines that a user is on a multiparty teleconference and the user has not said anything for the time period t2 (i.e., the adjustment platform 103 has not recognized any speech input of a volume higher than the threshold th2) and the user is moving (i.e., the adjustment platform 103 determines that the movement of the at least one device is greater than the threshold th1 over a period of time greater than t1), then the adjustment platform 103 can mute the at least one device. As previously discussed, in one or more embodiments, it is contemplated that once the adjustment platform 103 determines that the user has resumed speaking and/or has stopped moving, the adjustment platform 103 can restore the one or more functionalities of the at least one device back to their prior state (e.g., unmuting the device).

FIG. 4 depicts a process 400 of determining contextual information associated with the at least one device and causing one or more adjustments, one or more modifications, one or more presentations, or a combination thereof based, at least in part, on the contextual information. In one embodiment, the adjustment platform 103 performs the process 400 and is implemented in, for instance, a chip set including a processor and a memory as shown in FIG. 8. In step 401, the adjustment platform 103 processes and/or facilitates a processing of sensor information to determine the at least one state of movement, the at least one ongoing communication session, at least one level of speaking, at least one name of a user associated with the at least one device, or a combination thereof. As previously discussed, the state of movement includes, at least in part, location information, orientation information, speed information, acceleration information, time information, or a combination thereof. Moreover, the at least one device (e.g., the UE 101) may include, for example, one or more sensors such as a microphone, a GPS receiver, a compass, a magnetometer, a tilt or angle sensor, an accelerometer, or a combination thereof. By way of example, the adjustment platform 103 can determine the state of movement based, at least in part, on the position, orientation, movement or acceleration changes of the at least one device (e.g., a mobile phone or a tablet) being greater than the threshold th1 over the time t1 (e.g., a user slightly moving his or her device on a desk compared to a user walking with his or her device). In one embodiment, the adjustment platform 103 can determine at least one level of speaking based, at least in part, on whether the user has not said anything for the time period t2 (i.e., the adjustment platform 103 has not recognized any speech input of a volume higher than the threshold th2). In one or more embodiments, the adjustment platform 103 can also determine at least one level of speaking based, at least in part, on whether at least x number of people (e.g., two or more) on the teleconference are speaking at a volume higher than the threshold th2 within the time period t2 or less. In addition, the at least one level of speaking may also include background noise and/or a number of other people speaking in a public place. Further, in one embodiment, the adjustment platform 103 can determine that someone on one end of the teleconference is repeatedly saying the user's name without a response based, at least in part, on one or more speech recognition technologies.

In step 403, the adjustment platform 103 processes and/or facilitates a processing of the location information to determine at least one value of background noise, at least one muting zone, or a combination thereof. In particular, the adjustment platform 103 may determine that no one is speaking or making noise near the user while he or she is on a teleconference or the adjustment platform 103 may determine that there are a number of other users talking and/or that there is an above average amount of background noise near the at least one device (e.g., from a television, a radio, a street fair, etc.). Moreover, it is contemplated that a muting zone is an area or zone where there is a high density of people (e.g., a downtown area, a shopping area, a sports complex, a movie theater, etc.) and therefore a greater likelihood that any background noise will be greater than the threshold th2 and as such disrupt or disturb the ongoing teleconference.

In step 405, the adjustment platform 103 causes, at least in part, at least one modification of the one or more adjustments based, at least in part, on the at least one value of background noise, the at least one muting zone, or a combination thereof. By way of example, if the adjustment platform 103 determines that a user is in a noisy location, then the adjustment platform 103 can modify the time period t2 before the adjustment platform 103 will mute the at least one device (i.e., muting the at least one device more quickly). In one embodiment, the adjustment platform 103 can compare the location of the at least one device (e.g., the place, the position, the time, etc.) against one or more existing muting zones (e.g., a sports venue) and then adjust the one or more functionalities of the at least one device accordingly. By way of further example, if the adjustment platform 103 determines that a user is located in a muting zone (e.g., at a shopping center), the adjustment platform 103 can cause, at least in part, a muting of the at least one device (e.g., a mobile phone) by default rather than based, at least in part, on the user not speaking and/or moving.

In step 407, the adjustment platform 103 optionally causes, at least in part, at least one modification of at least one mapping application, at least one navigation application, at least one location-based application, or a combination thereof associated with the at least one device based, at least in part, on the at least one level of background noise, the at least one muting zone, or a combination thereof. By way of example, the adjustment platform 103 can cause, at least in part, the one or more muting zones to be drawn on and/or added to a mapping application, for example, so that the user can know where device muting is on by default and off elsewhere and therefore be able to quickly determine an area or zone that is more conducive to being on the teleconference.

In step 409, the adjustment platform 103 optionally determines one or more contexts associated with the user of the at least one device based, at least in part, on the at least one state of movement. By way of example, the one or more contexts may generally include, at least in part, a user moving while on a multiparty teleconference or the user approaching a known destination (e.g., a home, a daycare, a restaurant, an office, etc.). Then in step 411, the adjustment platform 103 determines the one or more adjustments based, at least in part, on the one or more contexts. By way of example, if the adjustment platform 103 determines that the user is on a teleconference and at least one other user is repeatedly saying the user's name while the user is not speaking and moving (e.g., walking into another room), then the adjustment platform 103 can initiate at least one generated call to be communicated by the adjustment platform 103 to at least one other device associated with the at least one other user. For example, the at least one generated call may state, "user 'A' is moving now with his or her attention on that at the moment." As previously discussed, it is contemplated that if the adjustment platform 103 can determine an area away from the user where it would be more likely that the user can respond, the adjustment platform 103 could cause, at least in part, at least one other generated call to be communicated by the adjustment platform 103 to the at least one other device (e.g., stating the estimated time that it will take the user to arrive into a better location to continue talking).

In step 413, the adjustment platform 103 causes, at least in part, a presentation of at least one other notification on the at least one device based, at least in part, on the one or more adjustments. By way of example, the at least one other notification may include, at least in part, one or more sounds, one or more lights, one or more vibrations, or a combination thereof associated with the at least one device. Consequently, the user can be informed by the adjustment platform 103 as to what is happening with his or her device as a result of the location, the movement, the noise, or a combination thereof.

FIG. 5 depicts a process 500 of optionally determining location information, one or more incoming calls, or a combination thereof associated with the at least one device and causing, at least in part, a presentation of at least one notification or at least one other modification of the one or more adjustments, respectively. In one embodiment, the adjustment platform 103 performs the process 500 and is implemented in, for instance, a chip set including a processor and a memory as shown in FIG. 8. In step 501, wherein the at least one user is driving and talking on the at least one device, the adjustment platform 103 can optionally process and/or facilitate a processing of the location information to determine at least one degree of driving complexity. More specifically, the adjustment platform 103 can determine that the user is driving and talking on the phone based, at least in part, on the vehicle's hands-free system and the adjustment platform 103 can determine that the user is approaching an area that requires additional attention to traffic (e.g., a complicated interchange, a traffic jam, etc.) based, at least in part, on the number of upcoming turns (e.g., a complicated intersection or interchange), the amount of traffic (e.g., based on one or more traffic updates from one or more services 115), or a combination thereof. As a result, in step 503, the adjustment platform 103 causes, at least in part, a presentation of the at least one notification on the at least one device based, at least in part, on the degree of driving complexity. By way of example, the at least one notification may include one or more audio, visual, haptic, or a combination thereof alerts.

In step 505, the adjustment platform 103 can optionally process and/or facilitate a processing of one or more incoming calls to the at least one device to determine at least one degree of priority for each of the one or more incoming calls. By way of example, one of the one or more calls may be from the spouse of the user and another one of the one or more calls may be from a stranger. More specifically, the adjustment platform 103 can determine the at least one degree of priority based, at least in part, on the time that the user spends on each call or based on user input. Then, in step 507, the adjustment platform 103 causes, at least in part, at least one other modification of the one or more adjustments based, at least in part, on the at least one degree of priority. For example, the criteria for muting the at least one device (e.g., the time period t2) could be different between the different calls (e.g., the at least one device could be muted more quickly for calls with a high priority).

Figure 6:
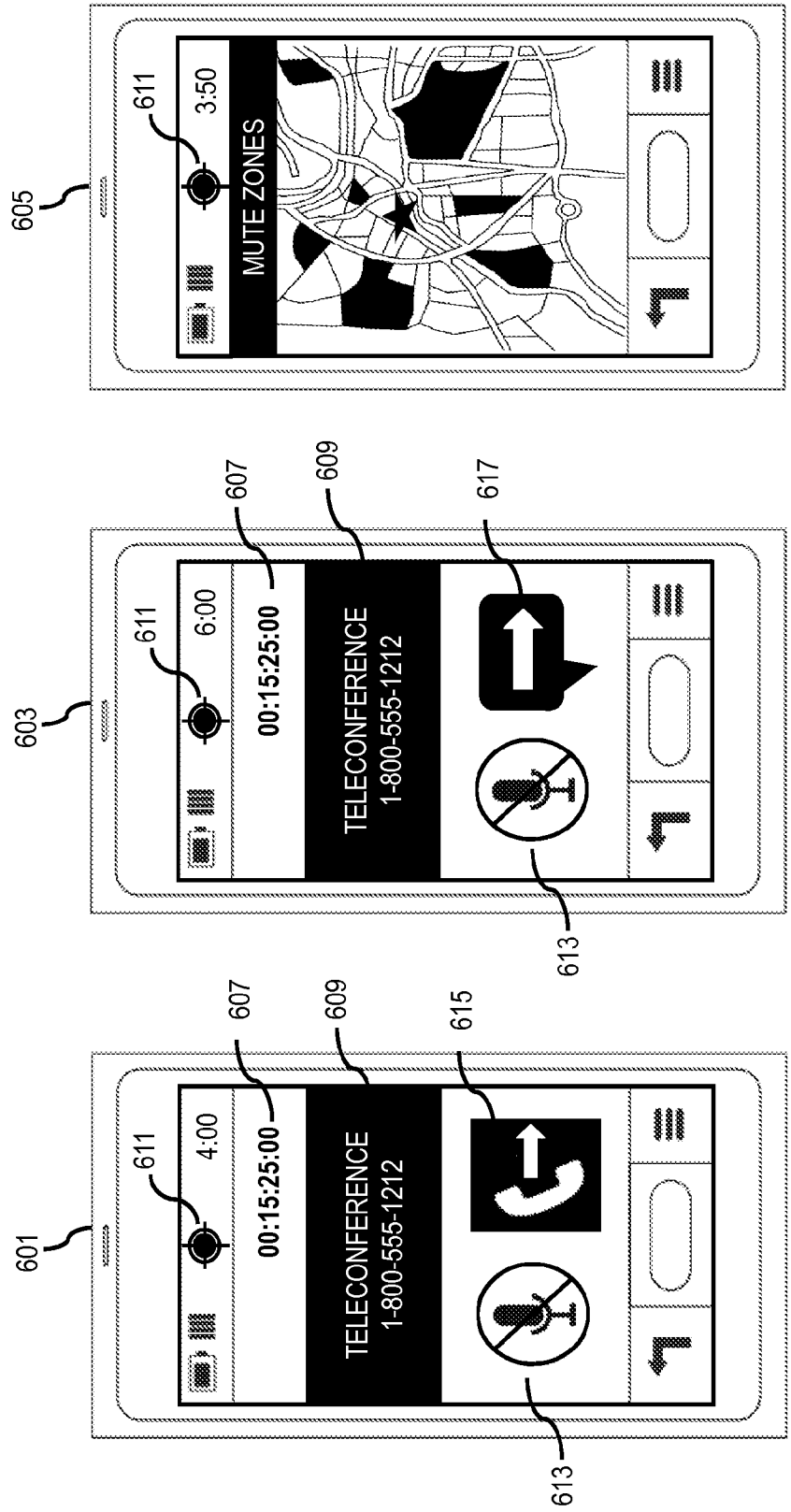
FIG. 6 is a diagram of user interfaces utilized in the processes of FIGS. 3-5, according to various embodiments.

FIG. 6 is a diagram of user interfaces utilized in the processes of FIGS. 3-5, according to various embodiments. As shown, the example user interfaces of FIG. 6 include one or more user interface elements and/or functionalities created and/or modified based, at least in part, on information, data, and/or signals resulting from the processes (e.g., processes 300, 400, and 500) described with respect to FIGS. 3-5. More specifically, FIG. 6 illustrates three user interfaces (e.g., interfaces 601, 603, and 605). As previously discussed, the system 100 determines at least one state of movement, at least one ongoing communication session, or a combination thereof associated with at least one device (e.g., the interfaces 601, 603, and 605). In particular, the state of movement includes, at least in part, location information, orientation information, speed information, acceleration information, time information, or a combination thereof and the at least one ongoing communication session is based, at least in part, on one or more telecommunication, data, voice, or a combination thereof connections.

In one embodiment, the system 100 processes and/or facilitates a processing of sensor information to determine the at least one state of movement, the at least one ongoing communication session, at least one level of speaking, at least one name of a user associated with the at least one device, or a combination thereof. As depicted in interfaces 601 and 603, the system 100 processes and/or facilitates a processing of the sensor information associated with the interfaces 601 and 603 (e.g., a microphone, a GPS receiver, etc.) to determine that the user is participating in an ongoing multiparty teleconference as shown by the running clock notification 607 and the ongoing connection notification 609. In addition, the system 100 can also determine that the user is moving (e.g., moving from one location to another) based, at least in part, on GPS, for example, as shown by the GPS symbol 611. In this example use case, the system 100 determines that the user is not speaking while he or she is moving.

In one or more embodiments, the system 100 causes, at least in part, an initiation of one or more adjustments to one or more functionalities of the interfaces 601, 603, and 605 (e.g., calling, messaging, etc.) based, at least in part, on the at least one state of movement, the at least one ongoing communication, or a combination thereof. In particular, the one or more adjustments are based, at least in part, on muting the at least one device (e.g., interfaces 601 and/or 603) at least one muted call, at least one generated call, at least one generated message, or a combination thereof. In this example use case, because the system 100 has already determined that the user is on a multiparty teleconference and has not said anything for a sufficient time period (e.g., the time period t2) and is moving, the system 100 mutes the at least one device as shown by the notification 613.

In one embodiment, the system 100 can also determine one or more contexts associated with the user of the at least one device based, at least in part, on the at least one state of movement. For example, the system 100 can generally determine that the user is moving or that the user is approaching a known destination (e.g., a home, a daycare, a restaurant, an office, etc.). In one or more embodiments, the system 100 then determines the one or more adjustments (e.g., device muting, call generation, message generation, etc.) based, at least in part, on the one or more contexts. In this example use case, the system 100 has already muted the interfaces 601 and 603 as a result of the ongoing teleconference and the movement of the user, but the system 100 also determines that at least one other user also on the teleconference is repeatedly saying the user's name while the user is not speaking and moving. As a result, the system 100 can initiate at least one generated call as depicted by the notification 615 of interface 601 to be communicated by the system 100 to at least one other device associated with the at least one other user. For example, the at least one generated call may state, "user 'A' is moving now with his or her attention on that at the moment." In another example use case, if the system 100 determines that the at least one user is approaching his or house after work, the system 100 can cause, at least in part, at least one generated message (e.g., an SMS) as depicted by the notification 617 of interface 603 to be communicated by the system 100 to at least one other device (e.g., the device of the user's spouse) stating that the user will be home in approximately 15 minutes, for example, so that the user's spouse can start getting food ready or otherwise prepare for the user's arrival, for example.

In one or more embodiments, the system 100 processes and/or facilitates a processing of the location information to determine at least one a value of background noise, at least one muting zone, or a combination thereof. More specifically, in one embodiment, it is contemplated that a muting zone is an area or zone where there is a high density of people (e.g., a downtown area, a shopping area, a sports complex, a movie theater, etc.) and therefore a greater likelihood that any background noise will be greater than the threshold th2 and as such disrupt and/or disturb the ongoing teleconference. In one embodiment, once the system 100 determines the at least one value of background noise, the at least one muting zone, or a combination thereof, the system 100 causes, at least in part, at least one modification of the one or more adjustments (e.g., device muting) based, at least in part, on the determination. In one example use case, if the system 100 determines that a user is located in a muting zone (e.g., at a shopping center), the system 100 can cause, at least in part, a muting of the at least one device by default rather than based, at least in part, on the user not speaking and/or moving. In this example use case, the system 100 determines that the user of interface 605 is not in a muting zone. Notwithstanding, in one embodiment, the system 100 can cause, at least in part, at least one modification of the mapping application of the interface 605. More specifically, the system 100 can cause, at least in part, the one or more muting zones (as depicted by the solid black coloring) to be drawn on and/or added to the mapping application so that the user can know where device muting is on by default and off elsewhere (e.g., where the user is standing as depicted by the star symbol of interface 605) and therefore be able to quickly determine an area or zone that is more conducive to being on the teleconference.

The processes described herein for adjusting one or more device functionalities based on location, movement, noise, or a combination thereof may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
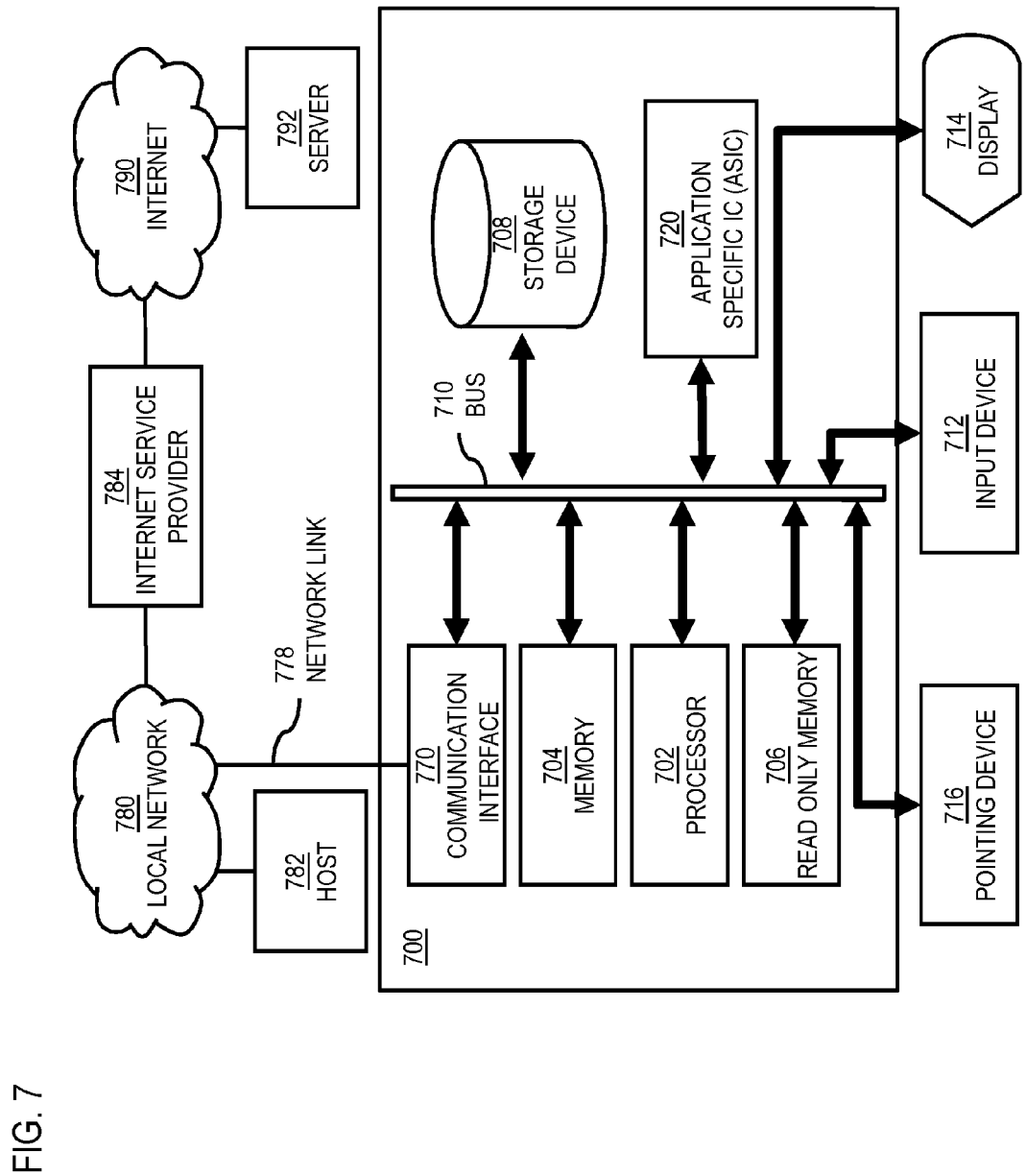
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to adjust one or more device functionalities based on location, movement, noise, or a combination thereof as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of adjusting one or more device functionalities based on location, movement, noise, or a combination thereof.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to adjust one or more device functionalities based on location, movement, noise, or a combination thereof. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for adjusting one or more device functionalities based on location, movement, noise, or a combination thereof. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for adjusting one or more device functionalities based on location, movement, noise, or a combination thereof, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for adjusting one or more device functionalities based on location, movement, noise, or a combination thereof to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server 792 connected to the Internet hosts a process that provides a service in response to information received over the Internet. For example, server 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to adjust one or more device functionalities based on location, movement, noise, or a combination thereof as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of adjusting one or more device functionalities based on location, movement, noise, or a combination thereof.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to adjust one or more device functionalities based on location, movement, noise, or a combination thereof. The memory 805 also stores the data associated with or generated by the execution of the inventive steps.

Figure 9:
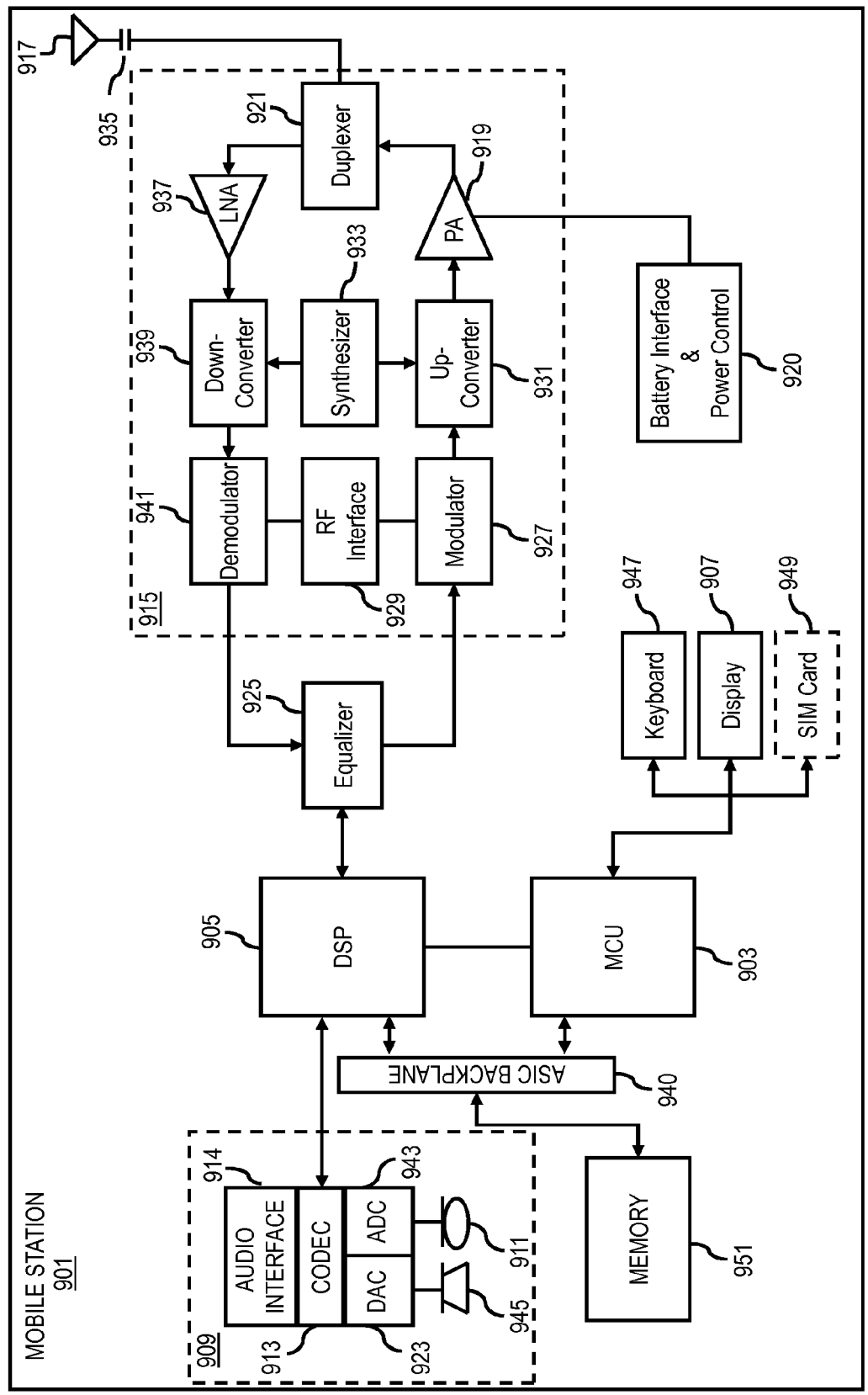
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of adjusting one or more device functionalities based on location, movement, noise, or a combination thereof. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, and a Digital Signal Processor (DSP) 905. A main display unit 907 provides a display to the user in support of various applications and mobile terminal functions that perform or support the steps of adjusting one or more device functionalities based on location, movement, noise, or a combination thereof. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913 and audio interface 914.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to adjust one or more device functionalities based on location, movement, noise, or a combination thereof. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal through an application-specific integrated circuit (ASIC) backplane 940. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
    at least one state of movement over a first threshold value and at least one level of speaking under a second threshold value during an ongoing communication session, detected by sensors associated with at least one device, wherein the at least one state of movement includes, at least in part, location information, orientation information, speed information, acceleration information, time information, or a combination thereof;

an initiation of one or more adjustments to one or more functionalities of the at least one device based, at least in part, on the at least one state of movement over the first threshold value and the at least one level of speaking under the second threshold value during the ongoing communication session, wherein the one or more adjustments to the one or more functionalities are based, at least in part, on muting the at least one device; and a restoration of the one or more adjustments to the one or more functionalities of the at least one device based, at least in part, on at least one determination of at least one state of movement under the first threshold value and at least one level of speaking over the second threshold value during the ongoing communication session, detected by the sensors associated with the at least one device, wherein the one or more adjustments to the one or more functionalities are based, at least in part, on unmuting the at least one device.

2. A method of claim 1, wherein the (1) data and/or (2) information and/or (3) at least one signal are further based, at least in part, on the following:
a processing of the location information to determine at least one value of background noise, at least one muting zone, or a combination thereof; and
at least one modification of the one or more adjustments based, at least in part, on the at least one value of background noise, the at least one muting zone, or a combination thereof.

3. A method of claim 1, wherein the (1) data and/or (2) information and/or (3) at least one signal are further based, at least in part, on the following:
a processing of sensor information to determine the at least one state of movement, the at least one ongoing communication session, at least one name of a user associated with the at least one device, or a combination thereof.

4. A method of claim 1, wherein the (1) data and/or (2) information and/or (3) at least one signal are further based, at least in part, on the following:
at least one determination of one or more contexts associated with the user of the at least one device based, at least in part, on the at least one state of movement; and
at least one determination of the one or more adjustments based, at least in part, on the one or more contexts.

5. A method of claim 1, wherein the at least one ongoing communication session is based, at least in part, on one or more telecommunication, data, voice, or a combination thereof connections.

6. A method of claim 4, wherein the at least one user is driving and talking on the at least one device, and wherein the (1) data and/or (2) information and/or (3) at least one signal are further based, at least in part, on the following:
a processing of the location information to determine at least one degree of driving complexity; and
a presentation of the at least one notification on the at least one device based, at least in part, on the degree of driving complexity.

7. A method of claim 1, wherein the (1) data and/or (2) information and/or (3) at least one signal are further based, at least in part, on the following:

a processing of one or more incoming calls to the at least one device to determine at least one degree of priority for each of the one or more incoming calls; and
at least one other modification of the one or more adjustments based, at least in part, on the at least one degree of priority.

8. A method of claim 7, wherein the at least one degree of priority is based, at least in part, on an amount of time that a user spends on each call.

9. A method of claim 2, wherein the (1) data and/or (2) information and/or (3) at least one signal are further based, at least in part, on the following:
at least one modification of at least one mapping application, at least one navigation application, at least one location-based application, or a combination thereof associated with the at least one device based, at least in part, on the at least one level of background noise, the at least one muting zone, or a combination thereof.

10. A method of claim 1, wherein the (1) data and/or (2) information and/or (3) at least one signal are further based, at least in part, on the following:
a presentation of at least one other notification on the at least one device based, at least in part, on the one or more adjustments.

11. An apparatus comprising:
at least one processor; and
at least one memory including computer program code for one or more programs, the at least one memory and the computer program code configured to, with the at least one processor, cause the apparatus to perform at least the following,
determine at least one state of movement over a first threshold level and at least one level of speaking under a second threshold level during an ongoing communication session, detected by sensors associated with at least one device, wherein the at least one state of movement includes, at least in part, location information, orientation information, speed information, acceleration information, time information, or a combination thereof;
cause, at least in part, an initiation of one or more adjustments to one or more functionalities of the at least one device based, at least in part, on the at least one state of movement over the first threshold level and the at least one level of speaking under the second threshold level during the ongoing communication session, wherein the one or more adjustments to the one or more functionalities are based, at least in part, on muting the at least one device; and
cause, at least in part, a restoration of the one or more adjustments to the one or more functionalities of the at least one device based, at least in part, on at least one determination of at least one state of movement under the first threshold value and at least one level of speaking over the second threshold value during the ongoing communication session, detected by the sensors associated with the at least one device, wherein the one or more adjustments to the one or more functionalities are based, at least in part, on unmuting the at least one device.

12. An apparatus of claim 11, wherein the apparatus is further caused to:
process and/or facilitate a processing of the location information to determine at least one value of background noise, at least one muting zone, or a combination thereof; and cause, at least in part, at least one modification of the one or more adjustments based, at least in part, on the at least one value of background noise, the at least one muting zone, or a combination thereof.

13. An apparatus of claim 11, wherein the apparatus is further caused to:
   process and/or facilitate a processing of sensor information to determine the at least one state of movement, the at least one ongoing communication session, at least one name of a user associated with the at least one device, or a combination thereof.

14. An apparatus of claim 11, wherein the apparatus is further caused to:
   determine one or more contexts associated with the user of the at least one device based, at least in part, on the at least one state of movement; and
   determine the one or more adjustments based, at least in part, on the one or more contexts.

15. An apparatus of claim 11, wherein the at least one ongoing communication session is based, at least in part, on one or more telecommunication, data, voice, or a combination thereof connections.

16. An apparatus of claim 14, wherein the at least one user is driving and talking on the at least one device, and wherein the apparatus is further caused to:
   process and/or facilitate a processing of the location information to determine at least one degree of driving complexity; and
   cause, at least in part, a presentation of the at least one notification on the at least one device based, at least in part, on the degree of driving complexity.

17. An apparatus of claim 11, wherein the apparatus is further caused to: process and/or facilitate a processing of one or more incoming calls to the at least one device to determine at least one degree of priority for each of the one or more incoming calls; and
   cause, at least in part, at least one other modification of the one or more adjustments based, at least in part, on the at least one degree of priority.

18. An apparatus of claim 12, wherein the apparatus is further caused to:
   cause, at least in part, at least one modification of at least one mapping application, at least one navigation application, at least one location-based application, or a combination thereof associated with the at least one device based, at least in part, on the at least one level of background noise, the at least one muting zone, or a combination thereof.

19. An apparatus of claim 11, wherein the apparatus is further caused to:
   cause, at least in part, a presentation of at least one other notification on the at least one device based, at least in part, on the one or more adjustments.

* * * * *